United States Patent Office 3,428,638
Patented Feb. 18, 1969

3,428,638
CERTAIN 2-IMINOBARBITURIC ACIDS
James M. Dille, Seattle, Wash., and Frank J. Stiefel, Princeton Junction, and Mervin Meyer, East Brunswick, N.J., assignors to Carter-Wallace, Inc., New York, N.Y., a corporation of Maryland
No Drawing. Continuation-in-part of application Ser. No. 523,922, Feb. 1, 1966. This application Feb. 10, 1967, Ser. No. 615,057
U.S. Cl. 260—256.4    5 Claims
Int. Cl. C07d 5/22; A61k 27/00

ABSTRACT OF THE DISCLOSURE

A group of compounds of the formula:

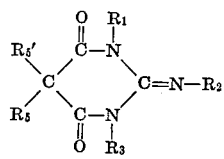

in which $R_2$, $R_5$ and $R_5'$ are alkyl having from 2 to 6 carbon atoms, $R_1$ is alkyl having from 1 to 6 carbon atoms, and $R_3$ is hydrogen or alkyl having from 1 to 6 carbon atoms. Said compounds are useful for inducing non-hypnotic sedation in warm-blooded animals.

---

The present invention relates to novel substituted hexahydropyrimidinediones. More particularly, the invention relates to novel substituted hexahydropyrimidine-4,6-diones which possess unique central nervous system depressant activities.

The present application is a continuation-in-part of Ser. No. 523,922, filed Feb. 1, 1966 now abandoned, which is in turn a continuation-in-part of Ser. No. 356,655, filed Apr. 1, 1964, now abandoned.

The soporific or hypnotic group of central nervous system depressants is a valuable class of medicinal agents widely prescribed by physicians. The general characteristic action of this group ranges from sedation to surgical anesthesia with increasing dosage. The major use of this class of soporific or hypnotic agents is for the production of sleep. When they are used in lower dose levels as sedatives, this sleep-producing action manifests itself and, therefore, represents a disadvantage to the use of this class of drugs for pure sedative effects. Indeed, they are contraindicated if the patient requires sedation but is expected to undertake normal everyday activities such as driving an automobile or the like.

It is an object of the present invention to provide novel substituted hexahydropyrimidine-4,6-diones which possess unique central nervous system depressant activities. It is another object of the invention to provide a novel sedative composition substantially free of the sleep-producing side effects which are common to the present soporific-hypnotic group of central nervous system depressants. It is a further object of the present invention to provide a method of inducing non-hypnotic sedation in warm-blooded animals. These and other objects of the invention will become apparent to one skilled in the art in the light of the instant specification.

In its broad aspect, the invention relates to substituted hexahydropyrimidine-4,6-diones of the general formula:

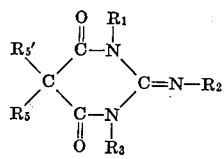

wherein $R_2$, $R_5$ and $R_5'$ are alkyl having from 2 to 6 carbon atoms, $R_1$ is an alkyl having from 1 to 6 carbon atoms, and $R_3$ is selected from the group consisting of hydrogen and alkyl having from 1 to 6 carbon atoms. The alkyl substituents of the compounds of the present invention can be straight or branched and can be exemplified by ethyl, propyl, isopropyl, n-butyl, 1-methylbutyl and the like.

To produce the novel 1,5,5-trialkyl-2-alkylimino hexahydropyrimidine-4,6-diones of the invention, the following reaction scheme, wherein $R_2$, $R_5$ and $R_5'$ are as hereinbefore defined, $R_1$ is an alkyl radical having from 1 to 6 carbon atoms and X is halogen, is followed:

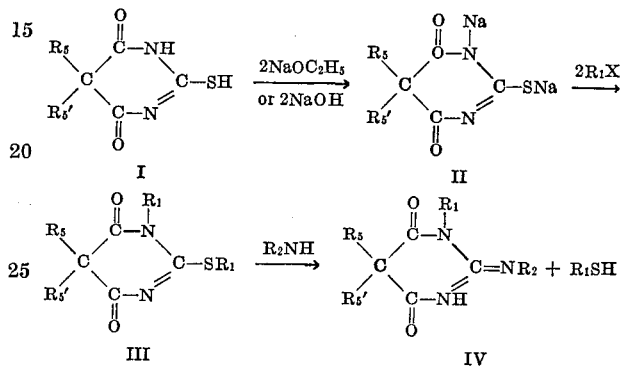

As indicated above, the appropriate 5,5-dialkyl-2-thiobarbituric acid (I) is converted to the di(alkali metal) salt (II) by reaction with at least twice the molar amount of sodium hydroxide in an aqueous medium or of sodium ethylate in an absolute ethanol medium. The resulting disodium salt is subsequently reacted with a lower alkyl halide of the formula $R_1X$ to form the S-alkyl-1,5,5-trialkyl-2-thiobarbituric acid (III).

After isolation by conventional means, the alkylmercapto intermediate (III) is reacted with the appropriate alkylamine to yield the desired 1,5,5-trialkyl-2-alkylimino hexahydropyrimidine-4,6-dione (IV).

To produce the additional group of compounds contemplated by the present invention, i.e., the 1,3,5,5-tetralkyl-2-alkylimino hexahydropyrimidine-4,6-diones, the appropriate 1,5,5-trialkyl-2-alkylimino hexahydropyrimidine-4,6-dione (IV) is further converted to the alkali metal derivative by reaction with a suitable agent, such as, for example, sodium hydride or sodium alcoholate. Preferred results have been obtained by using sodium hydride in a dimethylformamide reaction medium. The resulting sodium salt is then alkylated with a lower alkyl halide of the formula $R_3X$, wherein $R_3$ is the desired alkyl substituent for the three position.

As hereinbefore indicated, the novel compounds of the present invention are useful as central nervous system depressants and, in particular, in the preparation of sedative compositions which are substantially free of hypnotic effects.

The procedure by which the sedative activity of the compounds of invention was evaluated is a modification of the method originally described by Winter in J. Pharmacol. & Exper. Therap., 94, 7 (1948). Such method, widely accepted in pharmacology for the evaluation of the sedative effect of pharmaceutical compounds and commonly referred to as the "hexobarbital potentiation test," measures the ability of the compound to prolong the duration of sleep induced in mice by the administration of hexobarbital sodium.

The compound under consideration was administered intraperitoneally to mice in groups of ten at various dosages. Ten minutes after the injection of the test material, hexobarbital sodium was similarly administered at a dose of 100 mg. per kilogram of body weight of mouse. Groups of mice which received hexobarbital sodium only served as control. Sleeping time was calculated by observing the time of onset of sleeping and the time of return of the righting reflexes.

Following the above procedure, a number of the novel compounds were tested. Results and particulars are set forth in Examples A and B which follow.

EXAMPLE A

The activities of 1-methyl-2-propylimino-5-ethyl-5-(1-methylbutyl)-hexahydropyrimidine-4,6-dione (Compound 1) and 1 - methyl - 2 - propylimino-5,5-diethyl hexahydropyrimidine-4,6-dione (Compound 3) were determined by the hexobarbital potentiation technique. The results were as follows:

| Dosage Levels (mg./kg.) | | | Mean Sleeping Time (min.) |
| --- | --- | --- | --- |
| Compound 1 | Compound 3 | Hexobarbital Sodium | |
| 0 | 0 | 100 | 50±8 |
| 100 | 0 | 100 | 328 |
| 200 | 0 | 100 | 401 |
| 0 | 200 | 100 | 124 |

The $LD_{50}$ for the above compounds were found to be 488 and 865 mg./kg., respectively.

EXAMPLE B

The sedative activities of 1-propyl-2-propylimino-5-ethyl - 5-(1-methylbutyl)-hexahydropyrimidine-4,6-dione (Compound 4) and 1,3-dimethyl-2-propylimino-5-ethyl-5-(1-methylbutyl)-hexahydropyrimidine-4,6-dione (Compound 5) were determined as above. The following results were obtained:

| Dosage Levels (mg./kg.) | | | Mean Sleeping Time (min.) |
| --- | --- | --- | --- |
| Compound 4 | Compound 5 | Hexobarbital Sodium | |
| 0 | 0 | 100 | 50±8 |
| 100 | 0 | 100 | 386 |
| 200 | 0 | 100 | 532 |
| 0 | 200 | 100 | 167 |

The $LD_{50}$ values for the above compounds were found to be 388 and 1072 mg./kg., respectively.

From the above results, it is apparent that the compounds of the present invention possess unique sedative activity, as evidenced by their ability to prolong the duration of hexobarbital-induced sleep in mice to high degrees. Furthermore, sedation occurs at dose levels at which no hypnotic action manifests itself. In addition, it is apparent that the present compounds are non-toxic in amounts required to produce significant sedation.

The active compounds of the present invention can be administered to warm-blooded animals in their free form or in the form of their therapeutically acceptable salts. The term "therapeutically acceptable salts" as used herein and in the appended claims includes organic and inorganic acid addition salts, such as hydrohalides, phosphates, sulfates, acetates, citrates, and the like, as well as the alkali metal derivatives, such as, for example, the sodium derivative.

In general, while it is possible to administer the active ingredients of the present invention as pure compounds, it is preferred to incorporate said active ingredients with a suitable pharmaceutical carrier.

The preferred mode of administration is by oral route, with the active ingredient in the form of tablets or capsules. Suitable solid pharmaceutical carriers useful in the preparation of such tablets or capsules include, for example, starch, lactose, sucrose, glucose, gelatin, and the like.

The active ingredients of the invention in their free form or as their therapeutically acceptable salts can also be dissolved in a liquid pharmaceutical carrier, such as, for example, propylene glycol, polyethylene glycol, water, saline, and mixtures thereof, to form a solution suitable for administration by injection or for oral administration in a palatable form.

Unit dosage forms, such as tablets, capsules or injectable solutions, can contain any suitable predetermined amount of one or more of the active ingredients, in their free form or in the form of their therapeutically acceptable salts, and may be administered as desired. Solid unit dosage forms generally contain from about 25 to about 95% by weight of one or more of the active ingredients. Liquid dosage forms generally contain from about 0.1 gram to about 90 grams of active ingredients per 100 ml. of solution. An effective single dose of the active ingredient is generally in the range of 25 to 1000 mg.

The following examples illustrate the preparation of representative compounds of the present invention. The physical properties and analytical value of additional novel compounds which were prepared by substantially similar procedures are set forth in Table I which follows herein after.

EXAMPLE 1

Preparation of 1 - methyl - 2 - propylimino - 5 - ethyl - 5-(1-methylbutyl)-hexahydropyrimidine-4,6-dione (Compound 1)

To a solution of 320 g. of 50% sodium hydroxide and 484 g. 5-ethyl-5-(1-methylbutyl)-2-thiobarbituric acid in 4000 ml. of water there was added 624 g. of methyl iodide. The solution was stirred and refluxed for a period of 4 hours. The mixture was cooled, extracted with ether and the ether solution washed with 5% sodium hydroxide and with water and then dried over anhydrous sodium sulfate.

To the ether solution of S-methyl-1-methyl-5-ethyl-5-(1-methylbutyl)-2-thiobarbituric acid there was added 200 ml. of n-propylamine and the mixture refluxed for 3 hours. The ether was removed and the remaining oil dissolved in 2000 ml. of ethanol, bonecharred and diluted with 5 l. of ice-water. The precipitate which deposited was filtered, washed with water and crystallized from 50% aqueous acetone. There was obtained 377 g. of 1 - methyl - 2 - propylimino - 5 - ethyl - 5 - (1 - methylbutyl) - hexahydropyrimidine - 4,6 - dione, M.P. 106°–108° C.

EXAMPLE 2

Preparation of 1,3-dimethyl-2-propylimino-5-ethyl-5-(1-methylbutyl)-hexahydropyrimidine-4,6-dione (Compound 5)

To a mixture of 5 g. of 52% sodium hydride in oil in 250 ml. of dimethylformamide there was added 28.1 g. of 1-methyl-2-propylimino-5-ethyl-5-(1-methylbutyl)-hexahydropyrimidine-4,6-dione followed by 15.6 g. of methyl iodide. The resulting mixture was stirred for 2 hours, then heated to a temperature of about 80° for a period of one hour.

After standing overnight, the reaction mixture was diluted with 500 ml. of water, the solution extracted with ether and the ether layer washed with water. The ether solution was extracted with dilute hydrochloric acid, the acid solution alkalized with sodium hydroxide to separate the free base which was removed with ether, washed, dried, concentrated and the oily residue purified by distillation. The fraction boiling at 95–110° C. at 10μ was collected to yield 17.4 g. of 1,3-dimethyl-2-propylimino-5-ethyl-5 - (1 - methylbutyl) - hexahydropyrimidine - 4,6-dione, $n_D^{23}$ 1.4980.

TABLE I

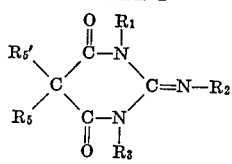

2-imino hexahydropyrimidinediones

| No. | $R_1$ | $R_2$ | $R_3$ | $R_5$ | $R_5'$ | M.P., °C. | Formula | Carbon, percent | | Hydrogen, percent | | Nitrogen, percent | |
|---|---|---|---|---|---|---|---|---|---|---|---|---|---|
| | | | | | | | | Calcd. | Found | Calcd. | Found | Calcd. | Found |
| 1 | Methyl | Propyl | H | Ethyl | 1-methylbutyl | 106–108 | $C_{15}H_{27}N_3O_2$ | 64.01 | 64.23 | 9.67 | 9.72 | 14.93 | 14.94 |
| 2 | Methyl | Isopropyl | H | Ethyl | Ethyl | 192–194 | $C_{12}H_{21}N_3O_2$ | 60.30 | 60.49 | 8.80 | 8.87 | 17.59 | 17.34 |
| 3 | Methyl | Propyl | H | Ethyl | Ethyl | 176–178 | $C_{12}H_{21}N_3O_2$ | 60.30 | 60.53 | 8.80 | 8.84 | 17.59 | 17.71 |
| 4 | Propyl | Propyl | H | Ethyl | 1-methylbutyl | Liquid | $C_{17}H_{31}N_3O_2$ | 65.98 | 66.15 | 10.10 | 10.04 | 13.58 | 13.61 |
| 5 | Methyl | Propyl | Methyl | Ethyl | 1-methylbutyl | Liquid | $C_{16}H_{29}N_3O_2$ | 65.05 | 64.84 | 9.89 | 9.76 | 14.22 | 13.97 |

Although the invention has been illustrated by the preceding examples and table, it is not to be construed as being limited thereby. Various departures may be made therefrom within the scope of the accompanying claims without departing from the principles of the invention.

What is claimed is:

1. A compound of the formula:

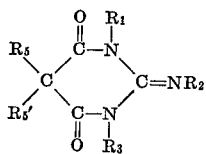

wherein $R_2$, $R_5$ and $R_5'$ are alkyl having from 2 to 6 carbon atoms, $R_1$ is an alkyl having from 1 to 6 carbon atoms, and $R_3$ is selected from the group consisting of hydrogen and alkyl having from 1 to 6 carbon atoms.

2. A compound as claimed in claim 1 wherein $R_1$ is methyl, $R_2$ is propyl, $R_3$ is hydrogen, $R_5$ is ethyl and $R_5'$ is 1-methylbutyl.

3. A compound as claimed in claim 1 wherein $R_1$ is methyl, $R_2$ is propyl, $R_3$ is hydrogen, and $R_5$ and $R_5'$ are ethyl.

4. A compound as claimed in claim 1 wherein $R_1$ and $R_2$ are propyl, $R_3$ is hydrogen, $R_5$ is ethyl and $R_5'$ is 1-methylbutyl.

5. A compound as claimed in claim 1 wherein $R_1$ and $R_3$ are methyl, $R_2$ is propyl, $R_5$ is ethyl and $R_5'$ is 1-methylbutyl.

References Cited

Barre et al. Chemical Abstracts, vol. 36 (1942), cols. 3853–4.

Lempert-Sreter et al., Berichte, vol. 93 (1960), pp. 2290–4.

Majima, Berichte, vol. 41 (1908), pp. 176–86.

ALEX MAZEL, Primary Examiner.

R. J. GALLAGHER, Assistant Examiner.

U.S. Cl. X.R.

260—260, 999.